Dec. 9, 1930. F. LEHMBECK 1,784,696
BAND SAW HOLDER
Filed Dec. 16, 1927 2 Sheets-Sheet 1

Dec. 9, 1930.    F. LEHMBECK    1,784,696
BAND SAW HOLDER
Filed Dec. 16, 1927    2 Sheets-Sheet 2
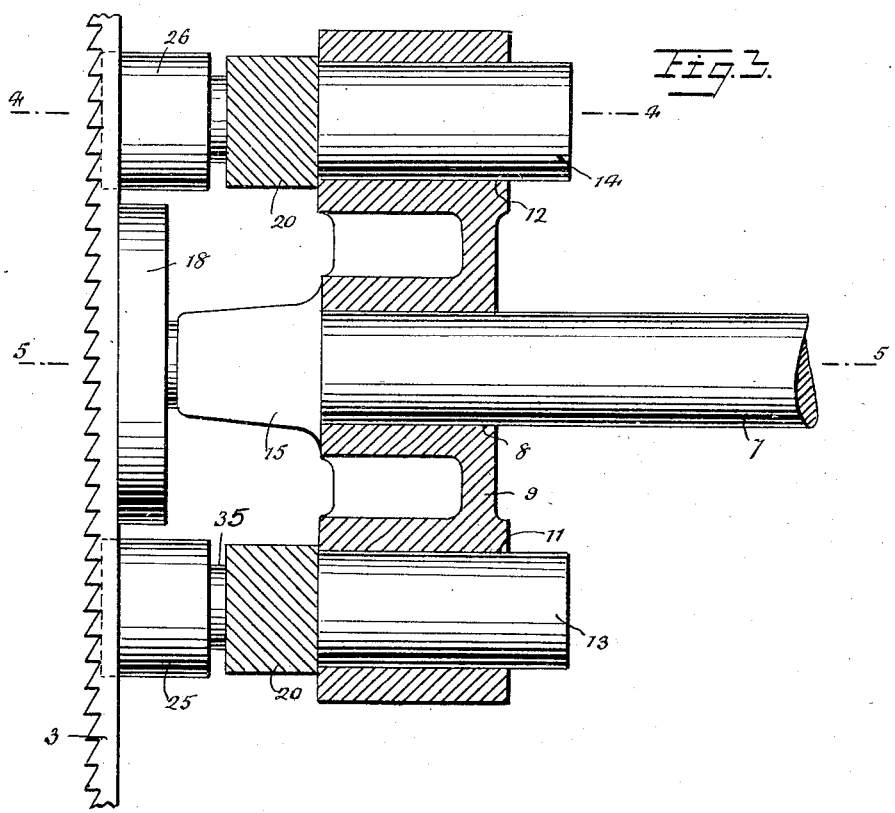
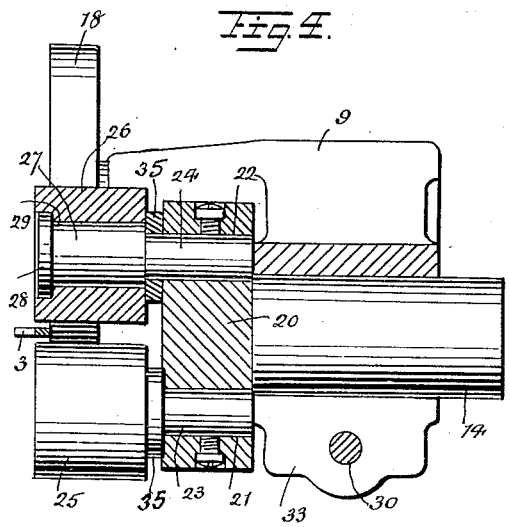
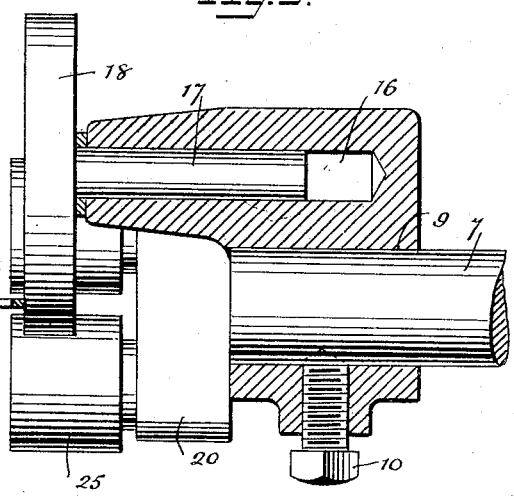
WITNESSES
H. T. Walker
A. L. Kitchin
INVENTOR
F. Lehmbeck
BY
ATTORNEY Patented Dec. 9, 1930

1,784,696

UNITED STATES PATENT OFFICE

FREDRICK LEHMBECK, OF NEW PROVIDENCE, NEW JERSEY

BAND-SAW HOLDER

Application filed December 16, 1927. Serial No. 240,553.

This invention relates to band saws, and particularly to an improved holding device for holding the saw structure in a desired position, the object being to present a structure which will not only guide the saw, but will prevent vibration thereof.

Another object of the invention is to provide a holder for band saws wherein different thicknesses of saw may be accommodated.

A still further object of the invention is to provide a holder for band saws which may be used on a band saw supporting frame having either a right or left hand arm.

In the accompanying drawings—

Figure 3 is a sectional view through Figure 2, approximately on line 3—3.

Figure 4 is a fragmentary sectional view through Figure 3 on line 4—4.

Figure 5 is a fragmentary sectional view through Figure 3 on line 5—5.

Figure 1:
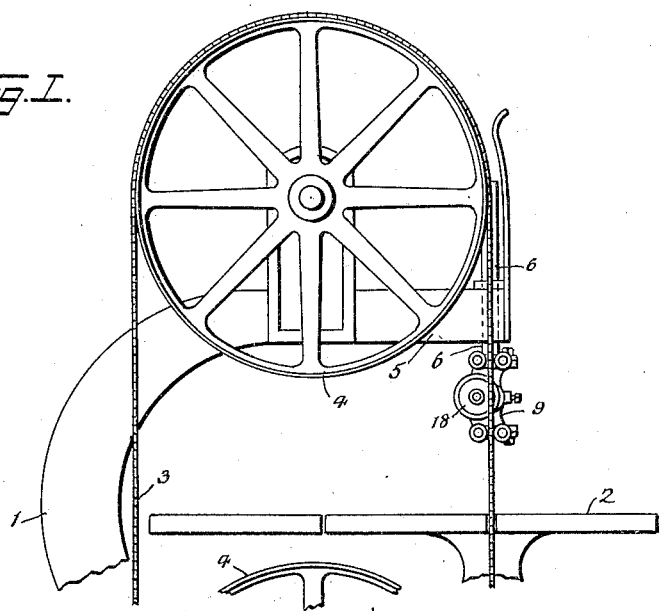
Figure 1 is a fragmentary front view of a band saw provided with a holder disclosing an embodiment of the invention.

Referring to the accompanying drawings by numerals, 1 indicates a band saw frame which may be of any desired type, and 2 the usual table. A saw 3 is carried by the frame 1, said saw passing over the usual pulleys 4. In the accompanying drawings, only one pulley has been shown, but it is understood that two are used in the usual manner, and that the frame 1, platform 2, pulleys 4 and saw 3, are all old and well known. The frame 1 is provided with an arm 5 which is also old and well known, said arm having a depending extension 6 which is provided with a shaft 7 which is rotatably fitted into a socket 8 and a holder frame 9. A clamping screw 10 acts to clamp the frame 9 rigidly to the shaft 7. The frame 9 is preferably a casting, and is provided with sockets 11 and 12 accommodating the shafts 13 and 14, and is also provided with a boss or projection 15. This boss or projection is provided with an aperture or bore 16, said aperture or bore 16 accommodating the shaft 17, which shaft is rigidly secured to the supporting wheel 18. The supporting wheel 18 is permitted to freely rotate, and is provided with a smooth faced flange 19 against which the back of the saw 3 presses. The shafts 13 and 14 and associated parts are identical in construction and, therefore, the description of one will apply to both.

As indicated particularly in Figures 3 and 4, shaft 14 is formed integral with a transverse block 20 which is provided with bores 21 and 22, said bores accommodating the shafts 23 and 24. Shaft 23 accommodates a roller 25, while shaft 24 accommodates a roller 26. Each of the shafts 23 and 24 is provided with an enlargement 27 merging into a head 28 overlapping the shoulder 29. A bearing washer 35 surrounds each of the shafts 23 and 24. By reason of this construction, the rollers or bearing sleeves 25 and 26 may freely rotate but may be moved in a circle as the shaft 14 is rotated.

Figure 2:
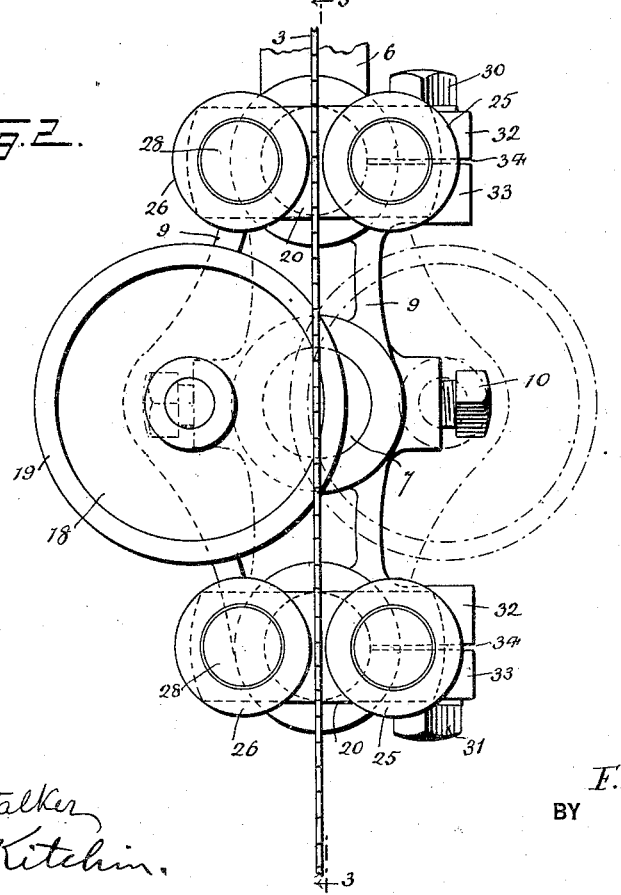
Figure 2 is an enlarged front view of the holder shown in Figure 1, part of the saw structure being shown in connection therewith.

When the device is first set up for use, the frame 9 is clamped to the shaft 7 in substantially the position shown in Figure 2. The shafts 13 and 14 are also arranged as shown in Figure 2 whereby the respective rollers 25 and 26 will be spaced away from the saw 3. After the parts have all been set as just described, the tension screw 30 is loosened and shaft 14 rotated slightly until the rollers 25 and 26 carried thereby, are in slight frictional contact with the saw 3. After this has been done, the screw 30 is tightened, screw 31 is loosened, and the same operation is performed at the bottom of the holder. In this way, all of the guiding and holding rollers are in contact with the sides of the saw, thus preventing any vibration and causing the saw to run true. If the saw 3 is removed at any time, and another saw placed in position, the shafts 13 and 14 could be slightly rocked to take care of the different thicknesses between the old saw and the new saw. It will be noted that the various guiding rollers 25 and 26 will function without in any way preventing the rear edge of the saw engaging the surface 19. As indicated in Figure 1, the holder is so positioned that wheel 18 is on the left side of the saw 3. If desired, the holder could be removed, inverted, and re-applied, whereupon the wheel 18 would be on the right hand side as viewed in Figure 1. This is sometimes desirable where the arm 5 extends from the opposite direction.

It will be observed from Figure 2 of the drawing, that the part of the frame 9 having the sockets 11 and 12, is formed with ears 32 and 33, and that these ears merge into the frame 9 with slots 34 arranged therebetween, said slots extending into the respective bores 11 and 12. This will permit the screws 30 and 31 to properly function to clamp the shafts 13 and 14 rigidly in any desired adjusted position.

What I claim is:

1. A guide for band saws and the like, comprising a support, a shaft engaged with said support at one end, a main cross-head carried at the other end of said shaft, swingable auxiliary cross-heads journaled in the opposite ends of said main cross-head and extending transversely thereof, a pair of roller supporting shafts journaled in each of said auxiliary cross-heads, a guiding roller mounted on each of said roller supporting shafts, said main cross-head being formed with an offset portion in the plane of the transverse center of the same, and a bearing roller journaled in said offset portion between and adjacent the guide rollers and having a portion of its peripheral edge projecting beyond the longitudinal center of said main cross-head for the engagement of the outer side face thereof with the back edge of a saw operating between said guiding rollers.

2. A guide for band saws and the like, comprising a support, a shaft engaged with said support at one end, a main cross-head carried at the other end of said shaft, pivotally mounted auxiliary cross-heads journaled on the opposite ends of said main cross-head and swingable in a plane parallel thereto, a pair of guide rollers carried by each of said auxiliary cross-heads, said main cross-head being formed with an offset portion in the plane of the transverse center of the same, and a bearing roller journaled in said offset portion between said auxiliary cross-heads and having a portion of its peripheral edge projecting beyond the longitudinal center of said main cross-head for the engagement of the outer side face with the back edge of a saw operating between the respective pairs of guide rollers, said offset being elongated beyond the outer face of said cross head to support said bearing roller in a plane passing through said guide rollers.

3. A guide for band saws and the like, comprising a support, a shaft adjustably engaged with said support at one end, a main cross head carried at the other end of said shaft, pivotally mounted auxiliary cross-heads journaled in the opposite ends of said main cross-head and positioned to rotate in a plane parallel thereto, means for locking said auxiliary cross-heads in different, adjusted positions with respect to said main cross-head, a pair of guide rollers carried by each of said auxiliary cross heads, said main cross-head being formed with an offset portion in the plane of the transverse center of the cross-head, and a bearing roller journaled in said offset portion between the guide rollers of the respective auxiliary cross-heads and having a portion of its peripheral edge projecting beyond the longitudinal center of said main cross head for the engagement of the outer side face thereof with the back edge of a saw operating between the respective pairs of guide rollers.

Signed at New York, in the county of New York and State of New York, this 15th day of December A. D. 1927.

FREDRICK LEHMBECK.